United States Patent [19]

Dezzani et al.

[11] Patent Number: 5,531,836
[45] Date of Patent: Jul. 2, 1996

[54] ROLLING BEARING AND METHOD OF MAKING SAME

[75] Inventors: Michael M. Dezzani, Torrington; David E. Beauregard, Burlington, both of Conn.

[73] Assignee: The Torrington Company, Torrington, Conn.

[21] Appl. No.: 362,285

[22] Filed: Dec. 22, 1994

[51] Int. Cl.$^6$ .............................. C22C 38/22; C21D 9/40; C23C 8/22
[52] U.S. Cl. ............................ 148/233; 148/906; 148/319
[58] Field of Search ................................... 148/906, 319, 148/233

[56] References Cited

U.S. PATENT DOCUMENTS

| | | | |
|---|---|---|---|
| 3,885,995 | 5/1975 | Cunningham et al. | |
| 4,659,241 | 4/1987 | Bamberger et al. | |
| 4,871,268 | 10/1989 | Furumura et al. | 384/492 |
| 4,904,094 | 2/1990 | Furumura et al. | 384/492 |
| 4,930,909 | 6/1990 | Murakami et al. | 384/492 |
| 5,030,017 | 7/1991 | Murakami et al. | 384/492 |
| 5,131,964 | 7/1992 | Spitzer . | |
| 5,147,140 | 9/1992 | Murakami et al. | 384/492 |
| 5,292,200 | 3/1994 | Matsumoto et al. | 384/492 |
| 5,352,303 | 10/1994 | Murakami et al. | 148/318 |

FOREIGN PATENT DOCUMENTS

| | | |
|---|---|---|
| 150984 | 10/1937 | Austria . |
| 0626468 | 11/1994 | European Pat. Off. . |
| 2445684 | 4/1976 | Germany . |
| 0259155 | 10/1989 | Japan ...................................... 148/233 |
| 40425457 | 9/1992 | Japan ...................................... 148/319 |
| 745013 | 2/1956 | United Kingdom . |

OTHER PUBLICATIONS

Dew–Technische Berichte, vol. 12, No. 1, 1972 Krefeld, DE, p. 51 NN 'Aufkohlung eines martensitischen Chromstahles . . . 'FIGS. 9,10.

P. M. Unterweiser et al. 'Worldwide Guide to Equivalent Irons and Steels,' 1987, ASTM, 2nd Edition, Ohio, US, pp. 6–108.

*Primary Examiner*—Deborah Yee
*Attorney, Agent, or Firm*—Michael H. Minns

[57] ABSTRACT

There is disclosed herein a steel alloy bearing having an inner race, an outer race and rolling elements comprising: at least one of said elements being made of alloy steel which constitutes from 10.0 to 18.0 wt % chromium and 0.05 to 0.30 wt % carbon, 0.10% to 2.0 wt % molybdenum, 0.15 to 1.0 wt % silicon, 0.20 to 1.5 wt % manganese, 0.8 to 1.2 wt % tungsten, 0.20 to 0.30 wt % vanadium, 0.2 to 1.0 wt % of nickel, and the remainder of said steel alloy being iron; and said at least one element having been carburized in a carbon atmosphere containing from 0.25 to about 0.40 % carbon potential.

5 Claims, 1 Drawing Sheet

ROLLING BEARING AND METHOD OF MAKING SAME

BACKGROUND OF THE INVENTION

This invention relates generally to rolling bearings, and more particularly to rolling bearings which have corrosion resistance and fracture toughness and to methods for making the bearings.

Anti-friction track rolling bearings are commonly used in a variety of machines and, in particular, in aircraft where the bearings are subject to high loads, and are exposed to corrosive environments. The high loads increase the surface pressure applied to the bearing elements causing metal fatigue leading to failure of the bearing. A unique feature of rolling bearings is that their useful life is not determined by wear but by metal fatigue of one of the elements, e.g., the inner race, the outer race or the rolling elements, under the repeated stresses of normal use. Fatigue failure, which occurs as a progressive flaking or pitting of the surfaces of the races and rolling elements, is accepted as the basic reason for the end of the useful life of such a bearing. In particular, the outer race experiences cyclic flexing which causes tensile stressing leading to fracture. The bearing elements need fracture toughness, specifically internal compressive stresses to counter applied tensile stress.

Because the load on a bearing determines the severity of the stress in the surfaces of the races and the rolling elements, if the load is increased the life of the bearing is shortened. This is usually expressed by the relationship in that the life of the bearing is inversely proportional to the load cubed. Thus, doubling the load will reduce the life of the bearing by a factor of 8. The life of a bearing under a given load will therefore be a certain number of revolutions. When a bearing is intended for use under heavy loads, such as in aircraft, it is desirable that the bearing have hardened surfaces to accommodate the added stresses.

To increase the strength of bearing elements, it is common to heat the steel alloy to carburize the alloy surface. Carburizing increases the hardness of the bearing surfaces to extend the life of the bearing, however, carburizing increases the carbon content of the steel which lowers corrosion resistance. AISI 52100 steel is widely used in these bearings because of excellent fatigue properties but does not have corrosion resistance. The material which has traditionally been used to improve corrosion resistance, AISI 440C stainless steel, does not have the fatigue properties comparable to AISI 52100 steel for fracture toughness. Thus, it is desirable to provide rolling bearings having increased fatigue life and corrosion resistance.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a steel alloy rolling bearing having an inner race, an outer race and rolling elements having increased fatigue life and corrosion resistance. At least one of the bearing elements constitutes a steel alloy which contains 10.0 to 18.0 wt % chromium, 0.05 to 0.30 wt % carbon. The steel alloy preferably also includes 0.7 to 7.5 wt % of one or more additional alloying elements. These ingredients include 0.10 to 2.0 wt % molybdenum, 0.15 to 1.0 wt % silicon, 0.20 to 1.5 wt % manganese, 0.8 to 1.2 wt % tungsten, 0.20 to 0.30 wt % vanadium, and 0.2 to 1.0 wt % nickel. It has been found that AISI 422 stainless steel is an especially preferred steel alloy.

The invention also provides a process for increasing the fatigue life and corrosion resistance of a steel alloy rolling bearing having an inner race, an outer race and rolling elements by treating the surface of the bearing elements. In carrying out the process, the alloy is heated at a temperature between 1400° F. and 1800° F. for about 2 to 70 hours in a carbon atmosphere containing from 0.25 to about 0.40 % carbon potential to create a differential between the carbon in the surface region and the core region of said element. The thus treated alloy is then quenched to retain the carbon differential. As a result of the present invention, the carbon content in the surface layer is from 0.35 to 1.2 wt % providing a rolling bearing that is improved in rolling fatigue and corrosion resistance.

The foregoing and other aspects will become apparent from the following detailed description of the invention when considered in conjunction with the accompanying FIGURE.

BRIEF DESCRIPTION OF THE DRAWING FIGURE

FIG. 1 is a graphical representation indicating relationships between the contents of carbon in the surface layer of an alloy steel which has been carburized and the depths of carbon concentration from the surface.

DETAILED DESCRIPTION

Figure 1:
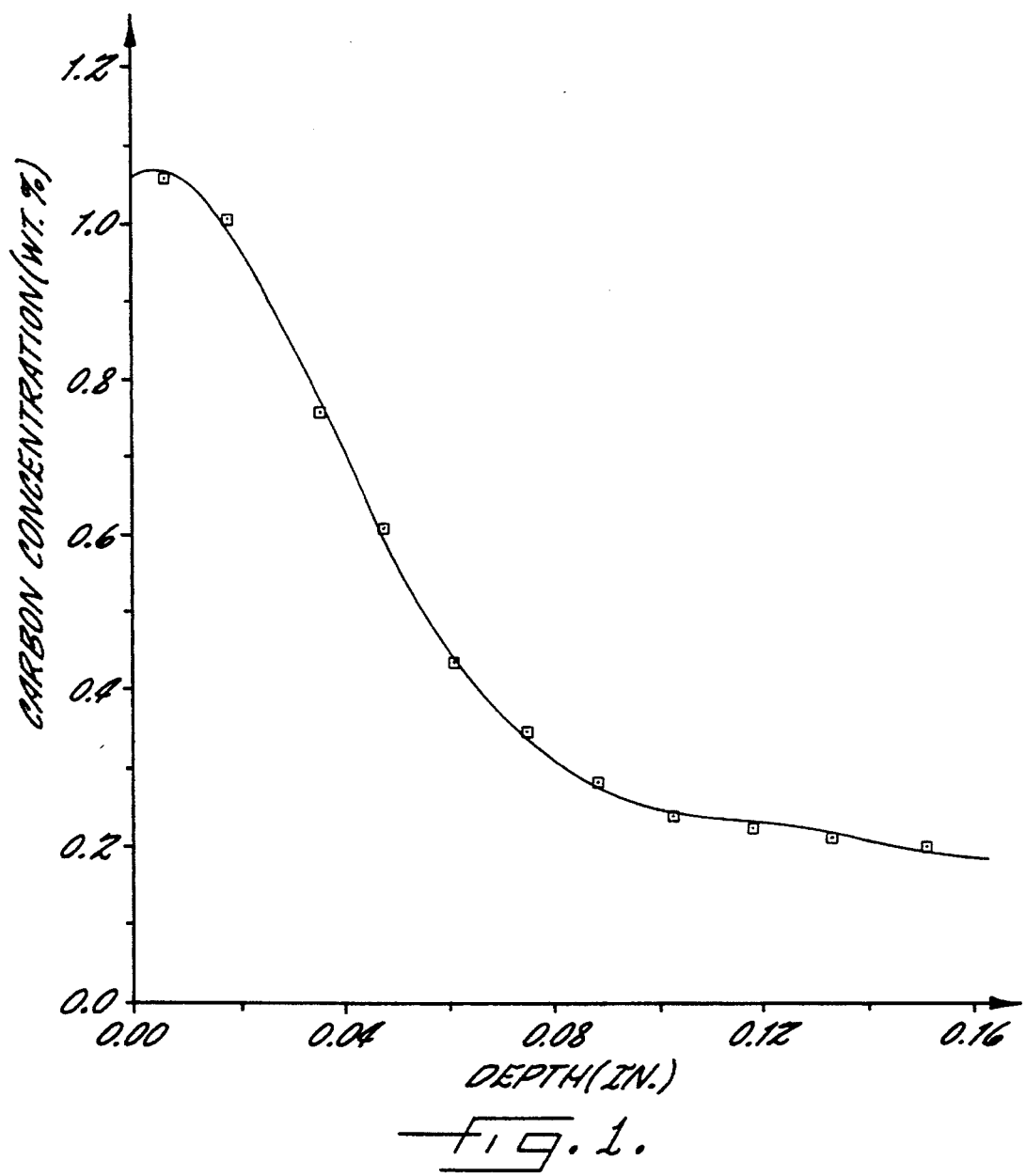

It has been found that a rolling bearing having inner race, outer race and rolling elements having increased fatigue life and corrosion resistance is provided when at least one of the bearing elements is made of a steel alloy which constitutes 10.0 to 18.0 wt % of chromium and from 0.05 to 0.30 wt % of carbon, preferably about 0.25 % carbon, with the balance being iron and to achieve the surface hardness, the bearing element is carburized in an atmosphere containing from 0.25 to 0.40 percent carbon potential to create a differential between the carbon in the surface region and the core region of the steel alloy.

The content of chromium in the alloy should be from 10.0 to 18.0 wt %. The chromium provides corrosion resistance in the carburized alloy and aids in precipitating the carbide in the surface layer.

The carbon content is in the range of 0.05 to 0.30 wt % which is the range of carbon steels commonly used to make bearing steel.

It has been found preferable to add other alloy elements, such as tungsten, manganese, molybdenum, silicon, vanadium, and nickel in amounts from 0.10 to 2.0 wt % molybdenum, 0.15 to 1.0 wt % silicon, 0.20 to 1.5 wt % manganese, 0.2 to 1.0 wt % nickel, 1 wt % tungsten, and 0.20 to 0.30 wt % vanadium.

Molybdenum and manganese add to the hardenability and material toughness. Nickel serves to improve the shock resistance.

An especially preferred alloy is AISI 422 stainless steel whose composition is as follows:

| Element | wt % |
| --- | --- |
| Chromium | 12.0 |
| Carbon | 0.25 |
| Molybdenum | 0.80 |
| Tungsten | 1.0 |
| Manganese | 0.7 |
| Nickel | 0.65 |
| Vanadium | 0.25 |
| Silicon | 0.75 |
| Iron | Remainder |

In carrying out the process for increasing the fatigue life and corrosion resistance of a steel alloy rolling bearing having an inner race, an outer race and rolling elements, the alloy is heated at a temperature between 1400° F. and 1800° F. for about 2 to 70 hours in a carbon atmosphere containing from 0.25 to about 0.40 % carbon potential, preferably 0.30 %, to create a differential between the carbon in the surface region and the core region of said element. The alloy is then quenched to retain said carbon differential.

The term "surface layer" as used herein is intended to mean a surface layer of which the depth is up to 0.1 inches. The aforementioned steel alloy may contain, in addition to the abovedescribed components, impurities such as oxygen and sulphur with content percentages allowable with the bearing steel. The Rockwell C hardness ($H_RC$) of the surface layer is preferably between 60–64.

The following example is provided to further illustrate the present invention and is not to be construed as limiting the invention in any manner. All parts are parts by weight unless otherwise stated.

EXAMPLE

Samples of a steel alloy having a composition as shown in the following Table 1 were formed into bearing elements and test cylinders and were subjected to the heat treatment described below:

TABLE 1*

| C | Cr | Mo | Si | Mn | Ni | V | W |
| --- | --- | --- | --- | --- | --- | --- | --- |
| 0.25 | 12.0 | 0.8 | 0.35 | 0.7 | 0.65 | 0.25 | 1.0 |

*all by wt %

The alloy steel was carburized at 1750° F. for 63 hours in a carbon atmosphere containing 0.3% carbon potential. The carburizing gas was a mixture of methanol, nitrogen and air in a ratio set to provide the desired amount of carbon. The steel alloy was then quenched with oil. The oil quenching step was carried out in room temperature oil and the elements were cooled in just a couple of minutes.

The steel alloy had a Rockwell C surface hardness after heat treating of $H_RC$ 62.

Cylinders of the steel alloy of Table 1 were lathed to successive depths of 0.010 inches and the carbon content determined at each depth. The results are shown in the graphical representation in FIG. 1. The results show that the carbon concentration was greatly increased at the surface and gradually decreased through the surface layer. The depth of the surface layer will depend upon the length of carburizing time.

The rolling fatigue life of the test pieces of all of the lots were tested at room temperature (25° C.) in a bearing life tester. For each lot, ten test pieces were tested, and a Weibull plot was formed by detecting the number of times of application of stress (service life) until each test piece suffered from flaking, and the Weibull distribution was utilized to obtain the $L_{10}$ life of each. A summary of the test results is shown in Table 2 below:

TABLE 2

| Dynamic Test Results | |
| --- | --- |
| Outer Ring Material | $L_{10}$ Life ($10^{-6}$) |
| 52100 Steel | 0.0936 |
| 440 SS | 0.0358 |
| 422 SS | 0.1254 |

The tests show that the outer ring (race) constituting the steel alloy of this invention had longer fatigue life due to the carbon in the surface layer than either of two commonly used materials found in the prior art. Less corrosion in AISI 422 SS outer rings than in the rings from AISI 440 SS and AISI 52100 steel was visually observed.

Outer rings from stainless steel alloy of the prior art and of the present invention were tested for static crush in a hydraulic press. A summary of the results appears in Table 3 below:

TABLE 3

| Static Test Results | |
| --- | --- |
| Outer Ring Material | Average Fracture Load (lb) |
| 52100 Steel | 9,337 |
| 440C SS | 10,003 |
| 422 SS | 12,375 |
| 422 SS | 12,292 |

These results show that outer rings made from AISI 422 SS and treated according to the present invention had superior static crush.

While this invention has been illustrated and described in accordance with preferred embodiments, it is recognized that other variations and changes may be made therein without departing from the invention as set forth in the claims.

Having described the invention, what is claimed is:

1. A Steel alloy bearing having an inner race, an outer race and rolling elements comprising at least one of said elements being made of alloy steel which constitutes from 10.0 to 18.0 wt % chromium, 0.05 to 0.30 wt % carbon, 0.8 to 1.2 wt % tungsten, 0.20 to 0.30 wt % vanadium and 0.2 to 1.0 wt % nickel; and said at least one element having been carburized in an atmosphere having from 0.25 to about 0.40 percent carbon potential.

2. A Steel alloy bearing having an inner race, an outer race and rolling elements comprising at least one of said elements being made of alloy steel which constitutes from 10.0 to 18.0 wt % chromium, 0.05 to 0.30 wt % carbon, 0.10 to 2.0 wt % molybdenum, 0.15 to 1.0 wt % silicon, 0.20 to 1.5 wt % manganese, 0.8 to 1.2 wt % tungsten, 0.20 to 0.30 wt % vanadium, and 0.2 to 1.0 wt % nickel; and said at least one element having been carburized in an atmosphere having from 0.25 to about 0.40 percent carbon potential.

3. A process for increasing the fatigue life and corrosion resistance of a steel alloy rolling bearing having an inner race, an outer race and rolling elements comprising:

(a) constituting at least one of said elements to contain 10.0 to 18.0 wt % chromium, 0.05 to 0.30 wt % carbon, 0.8 to 1.2 wt % tungsten, 0.20 to 0.30 wt % vanadium and 0.2 to 1.0 wt % nickel;

(b) heating said at least one element at a temperature between 1400° F. and 1800° F. for about 2 to 70 hours in a carbon atmosphere containing from 0.25 to about 0.40 percent carbon potential to create a differential between the carbon concentration in the surface region and the core region of said element; and (c) quenching said element to retain said carbon concentration differential.

4. A process for increasing the fatigue life and corrosion resistance of a steel alloy rolling bearing having an inner race, an outer race and rolling elements comprising:

(a) constituting at least one of said elements to contain 10.0 to 18.0 wt % chromium, 0.05 to 0.30 wt % carbon 0.10 to 2.0 wt % molybdenum, 0.15 to 1.0 wt % silicon, 0.20 to 1.5 wt % manganese, 0.8 to 1.2 wt % tungsten, 0.20 to 0.30 wt % vanadium, and 0.2 to 1.0 wt % nickel;

(b) heating said at least one element at a temperature between 1400° F. and 1800° F. for about 2 to 70 hours in an atmosphere containing from 0.25 to about 0.40 percent carbon potential to create a differential between the carbon concentration in the surface region and the core region of said element; and (c) quenching said element to retain said carbon concentration differential.

5. A process for increasing the fatigue life and corrosion resistance of a steel alloy rolling bearing having an inner race, an outer race and rolling elements comprising:

(a) constituting at least one of said elements to contain 10.0 5 to 18.0 wt % chromium, 0.02 to 0.30 wt % carbon, 0.10% to 2.0 wt % molybdenum, 0.15 to 1.0 wt % silicon, 0.20 to 1.5wt % manganese, 0.8 to 1.2 wt % tungsten, 0.20 to 0.30 wt % vanadium, and 0.2 to 1.0 wt % nickel;

(b) heating said at least one element at a temperature between 1400° F. and 1800° F. for about 2 to 70 hours in an atmosphere containing from 0.25 to about 0.40 percent carbon potential to create a differential between the carbon concentration in the surface region and the core region of said element; and (c) quenching said element to retain said carbon concentration differential.

* * * * *